April 21, 1959
J. L. WILLIAMS
2,883,148
METERING VALVE
Filed March 12, 1956
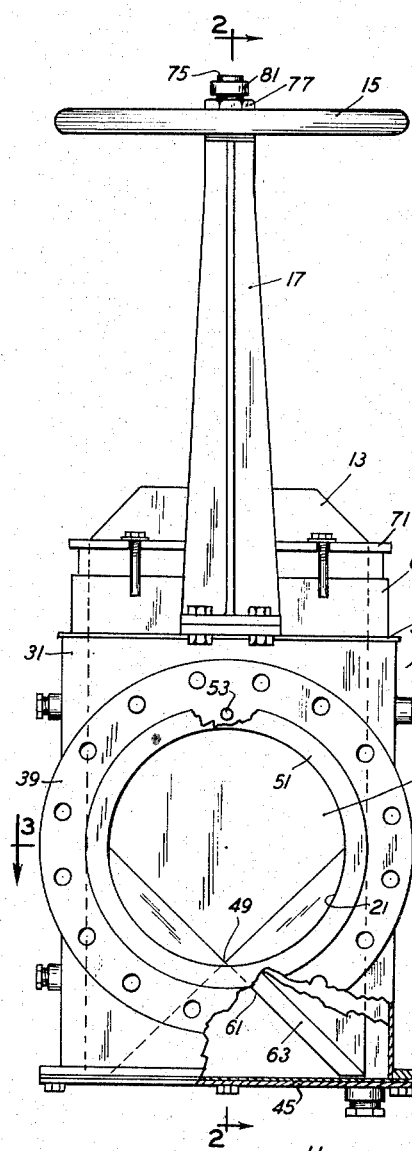
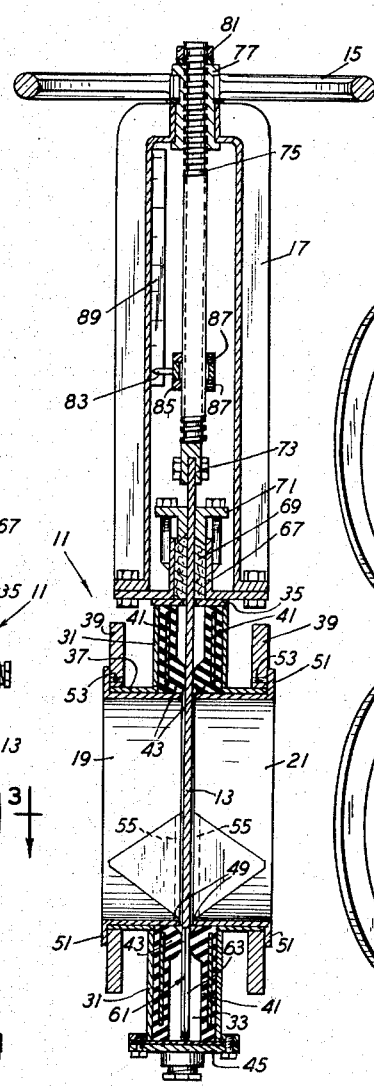
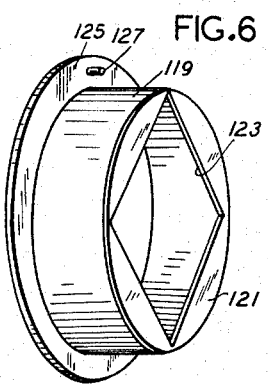
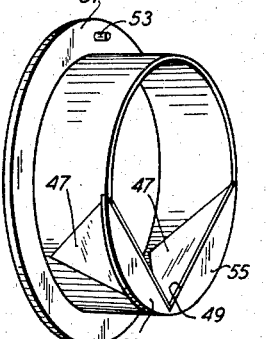
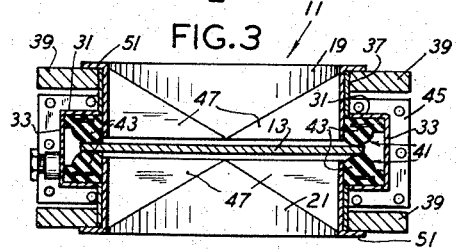
INVENTOR.
JOHN L. WILLIAMS
BY
*Buckhorn and Cheatham*
ATTORNEYS

United States Patent Office 2,883,148
Patented Apr. 21, 1959

2,883,148

METERING VALVE

John L. Williams, Portland, Oreg.

Application March 12, 1956, Serial No. 570,886

4 Claims. (Cl. 251—205)

This invention relates to valves and particularly to metering valves, and has certain features in common with the valve disclosed in my copending application entitled "Stock Valve," Serial No. 400,664, filed December 28, 1953.

Prior metering valves, especially those capable of handling paper stock, have been complicated and expensive in that they have had specially formed bodies which have been cast, forged, or otherwise formed, to provide the desired configuration of flow passage required in a metering valve.

It is a main object of the present invention to provide a metering valve of simple and relatively inexpensive construction as compared to prior metering valves, and in particular to provide a metering valve which is so fabricated that the parts thereof may readily and inexpensively be formed.

It is a further object of the present invention to provide a metering valve that may readily be converted to a gate valve when desired or found necessary.

A further object of the present invention is to provide a metering valve in which certain parts, which are subject to corrosion or erosion, may readily be removed and replaced when found necessary or desirable.

The valve of the present invention is characterized by having a valve body which has a through flow passage of cylindrical shape and a blade movable across the passage for closing and opening the valve. The blade has a downwardly facing notch in the lower end thereof, and there is a removable tubular insert cooperatively removably fitting within such passageway and having an inner end formed to define an upwardly facing notch for cooperating with the blade notch to provide a flow opening of predictable area and of desired configuration.

Various other objects of the present invention will be apparent from the following description taken in connection with the accompanying drawings in which:

Fig. 1 is an end view of a valve embodying the concepts of the present invention, with parts broken away to better show the internal construction of the valve, the gate blade being in its closed position;

Fig. 2 is a vertical sectional view through the valve taken along line 2—2 of Fig. 1;

Fig. 3 is a horizontal section taken along line 3—3 of Fig. 1;

Fig. 4 is a perspective view of a tubular metering insert;

Fig. 5 is a schematic end view of the valve showing the blade as having been partly raised or opened; and Fig. 6 is a perspective view of a modified insert.

Referring to the drawings, the valve includes a body generally entitled 11 having a gate blade 13 slidably projecting thereinto, the blade being adapted to be raised and lowered by the operation of a handwheel 15 mounted on a yoke 17 which in turn is mounted on the body 11. A pair of inserts 19 and 21 fit within the body and are formed to provide upwardly facing notches which cooperate with a downwardly facing notch on the gate blade to define a flow passage of predictable and desired area.

More in detail, the valve body 11 includes a rectangular chest comprising end wall plates 31, side wall plates 33, Fig. 3, and a top wall plate 35, all of which are permanently secured together as shown. Permanently secured to the end wall plates 31 are cylindrical inlet and outlet members 37, each of which has a bolting flange 39 secured thereto.

A pair of resilient seat members 41 are removably and slidably received within the rectangular chest and have resilient annular beads 43 disposed in sliding sealing engagement with the opposite sides of the gate blade 13. These seat members are more fully described in my copending application previously mentioned.

The bottom of the chest, as the parts are depicted in Fig. 2, is closed by a removable closure member 45 so that the seat members 41 are retained in the desired positions within the valve body.

Each of tubular inserts 19 and 21 is of similar construction and each is of generally cylindrical configuration, but having portions of the inner end thereof bent inwardly at 47 to define an upwardly opening V-shaped notch 49, the apex of which is disposed on the vertical diameter of the tubular insert. Preferably the angle of the notch is 90 degrees. Each tubular insert has a circular cross-sectional configuration at the outer end of the insert and merges gradually into an inner configuration which includes a semicircular upper portion and a V-shaped lower portion.

Each tubular insert is also provided with a flange 51 for fitting against the machined outer face of the associated bolting flange in sealing engagement therewith. The flange of each tubular insert is equipped with a locating pin 53 which cooperatively fits within an opening formed in the associated bolting flange. When the parts are thus arranged, the V-shaped notch 49 of the insert is oriented so that it faces directly upwardly, as the parts are depicted in Figs. 1 and 4. It is pointed out that when a pipe having a flange is bolted to one of the bolting flanges 39, a seal is formed between the machined end face of the flange of the pipe and the machined outer face of the flange 51 of the associated tubular insert.

A pair of apron pieces 55 are secured to the exterior of each insert adjacent the inner end thereof at the portions 47 and these apron pieces together with the upper portion of the inner end of an insert define a circle. Each insert terminates just short of the blade 13 and thus terminates opposite the bead of the associated seat member 41. This circular peripheral portion of the inner end of each tubular insert is disposed in sealing engagement with the inner surface of the associated resilient seat member 41, thus to prevent the accumulation of solids in the spaces between the portions 47 and the inlet and outlet members 37. Thus, this prevents paper stock from accumulating within such spaces and becoming discolored, and subsequently becoming mixed with fresh paper stock.

The gate blade 13 has a downwardly facing V-shaped notch 61 formed therein which terminates short of the side edges of the blade, as is apparent from Fig. 1. The angle of this notch is also preferably 90 degrees, and the lower edge of the blade is preferably beveled at 63, as shown in Figs. 1 and 2.

The blade 13 extends through the top wall plate 35 and through a packing box unit including a box 67, packing 69 and a gland 71. The upper end of the blade 13 is connected by a suitable clevis 73 to the lower end of a threaded stem 75, which extends at the upper portion thereof through a nut 77. A stop collar 81 is secured to the upper end of the stem 75. Nut 77 is fixed to the handwheel 15 and is journaled in the upper end of the yoke 17. The lower ends of the yoke 17 are secured to the box 67 which itself is permanently secured to the upper end of the valve chest.

The stem 75 carries an indicator finger 83 which is mounted by means of a holder 85 on the stem 75, the holder preferably being threaded on the stem and held in place by set screws 87. A scale 89 is secured to the inner face of one of the arms of the yoke 17 in a position adjacent the indicator finger 83, so that the position of the gate blade 13, and thus the size of the opening provided, is readily determinable by observing the position of the finger 83 relative to the scale 89.

In operation, when the gate blade 13 is partially open, such as disclosed in Fig. 5, a square or diamond shaped flow opening will be provided of predetermined size. Thus, in the paper making industry, it is possible with a metering valve of the present invention to regulate the pressure of flowing paper stock so that the desired weight of paper may be provided. Also, it is readily possible to provide an opening of a desired number of square inches because of the shape of the opening provided. Still further, a small opening may be provided which because of its square configuration will not dewater stock as would a crack opening of a conventional gate valve.

If it is desired to convert the valve to a conventional gate valve, the tubular inserts may be removed and the gate blade replaced by an un-notched blade. An insert may also readily be removed for replacement purposes when it has corroded or otherwise been damaged.

Fig. 6 shows a modified form of the invention including a tubular insert 119 including a cylindrical body portion, to the inner end of which is secured a metering plate 121 of circular configuration externally, and having a diamond shaped opening 123 formed therein. The peripheral edges of the plate 121 will be disposed in sealing engagement with the associated resilient seat member to define a seal therewith and prevent the passage of fluid between the exterior of the tubular insert and the outlet or inlet member of the valve body. This construction also prevents the provision of cavities into which the solids of paper stock may collect and become discolored. This tubular insert also has a flange 125 and a locating pin 127, as does the insert disclosed in Fig. 4.

Having described the invention in what is considered to be the preferred embodiment thereof, it is desired that it be understood that the invention is not to be limited other than by the provisions of the following claims.

I claim:

1. A gate valve comprising a valve body having a through flow passageway and a chest intermediate the ends of the passageway, a seat member within said chest having a resilient annular portion surrounding said passageway, a gate blade movable across said resilient annular portion in sealing engagement therewith to and from a closed position, a metering insert having a tubular portion slidably and removably received within said passageway, said tubular portion sealingly fitting within said annular resilient portion, said insert having portions adjacent the path of travel of said blade defining an aperture of predetermined size and shape of an area less than that of the interior of said tubular portion, said blade being movable across said aperture to afford metering openings of predetermined sizes and shapes, and means for retaining said insert in place and releasable to permit removal of said insert to facilitate operation of said valve as a simple gate valve rather than as a metering valve.

2. A gate valve as defined in claim 1 in which said tubular portion is cylindrical throughout its length and in which the portions of said insert defining said aperture extend radially inwardly from the inner end of said tubular portion.

3. A gate valve as defined in claim 1 in which certain parts of the inner end of said tubular portion are deformed radially inwardly and certain of the insert portions defining said aperture extend radially outwardly from the deformed portions to sealingly engage said annular resilient portion.

4. A gate valve as defined in claim 1 in which there is a second seat member on the side of the blade remote from said first seat member and having an annular resilient portion sealingly engaging said gate blade.

References Cited in the file of this patent

UNITED STATES PATENTS

| | | |
|---|---|---|
| 1,065,494 | Andersen | June 24, 1913 |
| 1,999,921 | Burkhardt | Apr. 30, 1935 |
| 2,616,655 | Hamer | Nov. 4, 1952 |
| 2,636,713 | Hamer | Apr. 28, 1953 |
| 2,732,170 | Shand | Jan. 24, 1956 |